United States Patent [19]

Harris et al.

[11] Patent Number: 5,407,508
[45] Date of Patent: Apr. 18, 1995

[54] METHOD FOR PRODUCING A REPLACEABLE OUTER RACE FOR BALL AND SOCKET BEARING

[75] Inventors: Bernard Harris, Northbrook; Dennis E. Bozych, Downers Grove, both of Ill.

[73] Assignee: Rexnord Corporation, Milwaukee, Wis.

[21] Appl. No.: 131,192

[22] Filed: Oct. 1, 1993

[51] Int. Cl.⁶ .................... F16C 33/20; B65H 81/00
[52] U.S. Cl. ............................. 156/173; 156/169; 156/172; 156/175; 29/898.049; 29/898.05; 29/898.055; 29/898.066; 384/206; 384/212; 384/297
[58] Field of Search ............... 156/169, 173, 175, 172, 156/155; 29/898.049, 898.05, 898.051, 898.055, 898.059, 898.066; 384/297–300, 206, 212

[56] References Cited

U.S. PATENT DOCUMENTS

| | | |
|---|---|---|
| 1,301,527 | 4/1919 | Weibull ........................ 29/898.066 |
| 2,260,283 | 10/1941 | Halford et al. ................... 384/212 |
| 3,084,417 | 4/1963 | Picca . |
| 3,116,539 | 1/1964 | Evans et al. . |
| 3,428,374 | 2/1969 | Orkin et al. . |
| 3,536,367 | 10/1970 | Papish . |
| 3,779,619 | 12/1973 | Van Dorn et al. ................ 384/206 |
| 3,802,756 | 4/1974 | Turner ............................ 384/206 |
| 3,888,554 | 6/1975 | McCloskey . |
| 3,974,009 | 8/1976 | Butzow et al. . |
| 4,846,590 | 7/1989 | Teramachi . |
| 4,848,934 | 7/1989 | Blakely et al. . |
| 5,062,208 | 11/1991 | Goforth ........................ 29/898.05 |
| 5,288,354 | 2/1994 | Harris et al. ................... 29/898.055 |

FOREIGN PATENT DOCUMENTS

| | | |
|---|---|---|
| 604699 | 9/1960 | Canada . |
| 553067 | 5/1943 | United Kingdom ............... 384/206 |
| 554879 | 7/1943 | United Kingdom . |

Primary Examiner—Jeff H. Aftergut
Attorney, Agent, or Firm—Michael, Best & Friedrich

[57] ABSTRACT

A method of producing a replaceable one piece annular outer race having an axial bore, an uninterrupted inner annular concave raceway facing into the bore and an outer surface. The method comprises the steps of applying an overlayment of filaments onto a cylindrical axially split mold assembly to form a one piece outer race substrate. The mold assembly includes first and second separable semi-cylindrical mold halves each having a semi-cylindrical convex outer mold surface, a mounting bore extending axially through the mold assembly, a removal axis normal to the mounting bore axis and a support removably mounted in the mold assembly mounting bore. A coat of hardenable liquid resin is applied to penetrate the filament overlayment substrate, after which the coated substrate is cured to form a hardened one piece outer race on the mold assembly. The cylindrical mold halves are removed from the hardened outer race to yield a single piece annular outer race. The support is removed axially from the mold mounting bore.

15 Claims, 1 Drawing Sheet

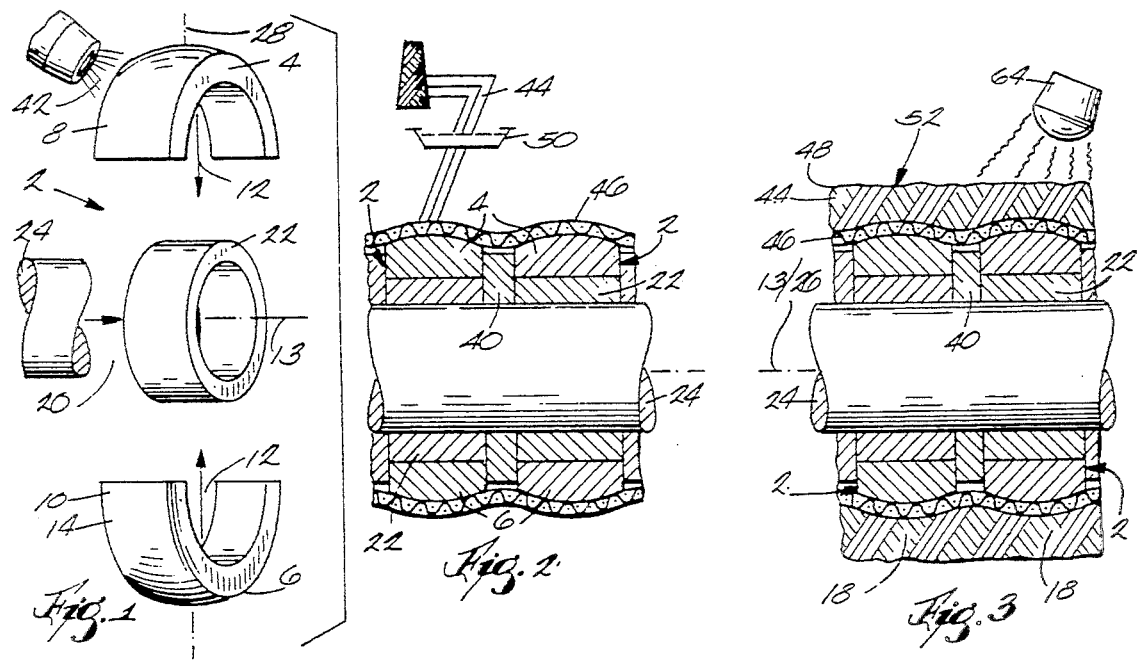
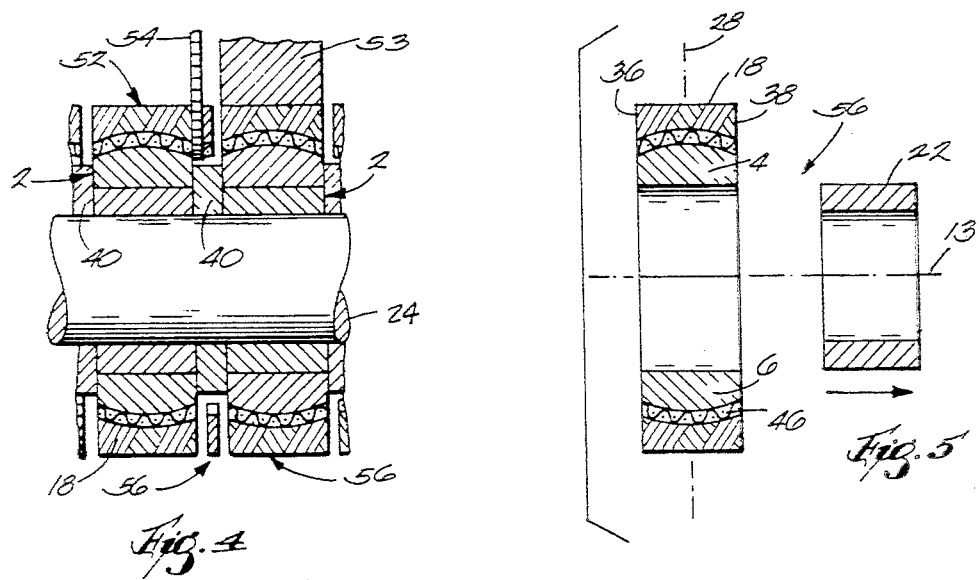
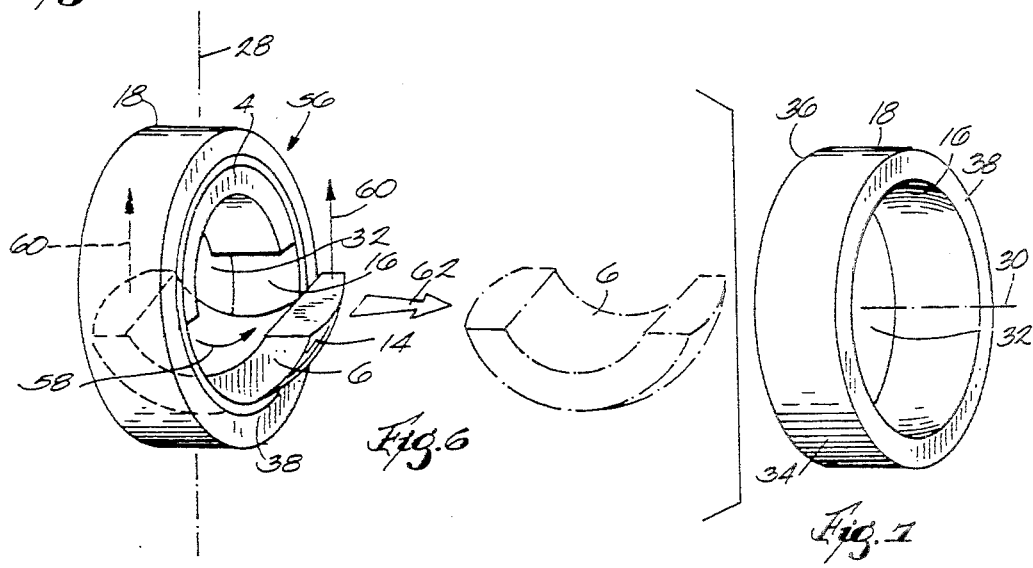

METHOD FOR PRODUCING A REPLACEABLE OUTER RACE FOR BALL AND SOCKET BEARING

BACKGROUND OF THE INVENTION

This invention relates to a method for producing a replaceable outer race for a ball and socket bearing, and more particularly, to an improved method for producing a filament wound one piece annular replaceable outer race for use on wide spherical balls.

Ball and socket bearings are designed for applications where both misaligning and oscillatory motions are present. These bearings are sometimes referred to as self-aligning bearings, and typically comprise a bearing with a spherical outer diameter, referred to as the ball, mounted within an opening, or the socket of a housing, thus forming the ball and socket bearing. The housing is frequently referred to as an outer race because the ball is mounted to rotate therein. In some installations the outer race is mounted within a separate outer housing such as a pillow block. In such outer race installations the outer race is in an intermediate position between the ball and the pillow block and thus may be referred to as an intermediate race instead of an outer race. However, for convenient reference, the term "outer race" will be used even though in some bearing assemblies the race may be located in an intermediate position. The outer race has an internal annular raceway integral therewith that is concave when viewed in section to mate with the outer surface of the spherical ball. The internal raceway and the outer spherical diameter of the ball must have a predetermined close tolerance fit to assure consistent bearing performance and long life.

It is known in the ball and socket bearing art to non-separably assemble the outer race to form an integral ball and socket bearing assembly. In integral ball and socket bearings the outer race is formed over a preformed spherical ball by molding, casting, filament winding or the like to complete the bearing assembly or the outer race may be first partially preformed, then placed on the spherical ball and finally forged, swaged or coined to complete the integral bearing assembly. When one element of an integral ball and socket bearing assembly fails the entire assembly is discarded.

It is also known to make a separable ball and socket bearing to permit replacement of either the spherical ball or the outer race. British Patent 554,879 issued Jul. 22, 1943 to Phillips and Power Aircraft Limited provides insertion flats on the spherical ball which allows it to be removably installed in the outer race. U.S. Pat. No. 3,116,539 issued Jan. 7, 1964 to Evans et al. and U.S. Pat. No. 4,848,934 issued Jul. 18, 1989 to Blakely et al. provide insertion slots in the outer race to permit installation and removal of the spherical ball. U.S. Pat. No. 3,888,554 issued Jun. 10, 1975 to McCloskey discloses a replacable spherical ball that includes at least three spherical interlocked segments to permit its removal and installation in the outer race.

Annular outer races for use in ball and socket bearings are normally produced by casting machining, or permanently fabricated on the ball in some way, for example, by filament winding, forging or swaging, which makes their production expensive. Requirements for lining a concave internal raceway of an outer race with a self-lubricating material adds to manufacturing costs and to the difficulty of producing an annular outer race wherein the integrity of the bond between the outer race and self-lubricating material is strong enough to insure that the outer race is durable under heavy duty rough service.

SUMMARY OF THE INVENTION

Therefore, in spite of extensive development in the bearing art, a need exists for a simple, low cost method for producing a durable replaceable annular outer race, without insertion slots for use in a separable ball and socket bearing. More specifically, a need exists for an improved method of producing an axially wide filament wound replaceable annular outer race having a raceway of self-lubricating material durably bonded thereto in a simple and inexpensive manner.

The method of the present invention produces a one piece annular replaceable outer race having an outer race axis, an axial bore, an uninterrupted annular inner concave raceway facing into the bore and an outer surface. The outer race may have a raceway lined with self-lubricating material.

The method generally comprises the steps of applying an overlayment of filaments onto a cylindrical axially split mold assembly which comprises a mold axis, first and second separable mold halves having semi-cylindrical convex outer mold surfaces, a mounting bore extending axially through the mold, a removal axis normal to the mold axis and a cylindrical support removably mounted in the mounting bore.

An overlayment of filaments is applied on the mold assembly to form a one piece outer race substrate. A coat of hardenable liquid resin is applied to penetrate the filament overlayment, after which the coated substrate is cured to form a hardened one piece outer race on the mold assembly. The cylindrical support is removed axially from the mold mounting bore. One of the cylindrical mold halves is rotated about the removal axis 90° relative to the other of the mold halves. The rotated one of the mold halves is then moved parallel of the removal axis toward the other mold half to displace the convex outer mold surface thereof from the inner raceway of the hardened race, and then moved along the outer race axis to withdraw the one mold half from the bore of the hardened race. Finally, the other mold half is first rotated about the removal axis, second moved along the removal axis toward the center of the hardened race bore and third, moved parallel of the mounting bore axis to withdraw the other mold half from the hardened race outer race bore.

The invention also covers the replaceable one piece outer race produced by the novel method explained herein.

Other features and advantages of the invention will become apparent to those of ordinary skill in the art upon review of the following detailed description, claims, and drawings.

BRIEF DESCRIPTION OF THE DRAWINGS

FIG. 1 is a perspective exploded view of one axially split mold assembly comprising two mold halves, a cylindrical support and a mandrel.

FIG. 2 is a cross sectional view of several mold assemblies of FIG. 1 mounted on the mandrel.

FIG. 3 is a cross sectional view of a plurality of mold assemblies assembled on the mandrel and showing a layer of self-lubricating fabric and an overlayment of filaments on the mold assemblies.

FIG. 4 is a cross sectional view of the mold assemblies of FIG. 3 with the outer races thereon being finished and radial plane cut into individual outer races each mounted on its associated mold assembly.

FIG. 5 is a cross sectional view of one mold assembly of FIG. 4 removed from the mandrel and showing the cylindrical support removed from the mold bore.

FIG. 6 is a perspective view of the one mold assembly shown in FIG. 5 with one mold half rotated about a removal axis and additionally showing the rotated mold half in phantom removed from the replaceable outer race.

FIG. 7 is a perspective view of a finished replaceable one piece outer race.

DESCRIPTION OF THE PREFERRED EMBODIMENT

Referring to FIGS. 1 and 2, a cylindrical axially split separable mold assembly 2 is provided. The mold assembly 2 comprises first and second semi-cylindrical mold halves 4, 6 each having convex outer mold surfaces 8 and 10 respectively. The mold halves, when assembled, define a mold bore 12, having a bore axis 13. When the mold halves 8 and 10 are assembled, the outer surfaces 8 and 10 coact to define an uninterrupted annular surface 14 that is dimensioned and configured to provide the base for an inner annular raceway 16 of a one piece outer race 18 (see FIG. 7) that is to be formed on the mold assembly 2 in a manner to be described. The mold assembly 2 further includes a support 20 that is preferably cylindrical. The cylindrical support 20 can include a cylindrical sleeve 22 and a mandrel 24. The mold halves 4, 6 are mounted on the sleeve 22 which is in turn is mounted on the mandrel 24. The mandrel 24 has an axis 26 that is coaxial with bore axis 13 when assembled. In the alternative, the cylindrical sleeve 22 could be omitted and the mold halves 4, 6 mounted directly on the mandrel 24. The mold assembly 2 further includes a removal axis 28 which is normal to bore axis 13 as is best shown in FIG. 1.

The method which will now be described can be used to produce a single one piece annular replaceable outer race 18 or a plurality of identical one piece outer races 18 each as shown in FIG. 7, having an outer race axis 30, an axial bore 32, an uninterrupted inner concave raceway 16 facing into the bore 32 lined with a self-lubricating material, an outer surface 34 and axially spaced end surfaces 36, 38. Referring to FIG. 2 the method for producing a plurality of outer races 18 comprises the initial step of mounting a plurality of individual mold assemblies 2 in axial alignment on mandrel 24 separated by spacers 40. If a single outer race 18 is to be produced only one mold assembly will be placed on mandrel 24. The mold halves 4 and 6, and the cylindrical sleeve 22 may be coated with a heat degradable adhesive 42 to hold them in an assembled position. The removal axis 28 of each mold assembly 2 when installed, is normal to the mandrel axis 26 and the cylindrical support 20 that is coaxially mounted thereon.

An overlayment of filaments 44 such as fiberglass is applied under tension in known manner directly onto the mold assemblies 2 or as illustrated in FIG. 2 on a layer of self-lubricating material 46 as, for example, a fabric woven from fibers of a self-lubricating material such as Teflon, or a combination of Teflon and Dacron fibers, to conform it to mold surface 14 and to form an elongated one piece outer race substrate 48 (see FIG. 3). The fabric may be heat shrunk to assist it in conforming to the mold surface 14. A coat of hardenable liquid resin 50 is applied in known manner to the filaments 44 or to the substrate 48 so that resin 50 penetrates the overlayment of filaments 44. Referring to FIG. 3, the coated substrate 48 is cured to form a hardened elongated member 52 comprising a plurality of hardened unsevered one piece outer races 18 each surrounding one of the mold assemblies 2.

Referring to FIG. 4, the hardened elongated member 52 is provided with a desired external surface by a finishing tool 53 and then severed by a radial plane cutter 54 at each of the spacers 40 to create a plurality of individual outer race assemblies 56 (see FIG. 5), each including one outer race 18 on one of the mold assemblies 2 with finished end surfaces 36, 38. If desired severing could be done first followed by application of finishing tool 53.

Referring to FIG. 5, one assembly 56 is shown removed axially from the mandrel 24. If the mold assembly 2 includes the cylindrical sleeve 22, cylindrical sleeve 22 is axially removed from that assembly 56, as shown in FIG. 5. Referring to FIG. 6, one of the cylindrical mold halves, for example half 6, of a selected assembly 56 is then rotated as indicated by arrow 58 about the removal axis 28 substantially 90° relative to the other of the mold halves 4 and the rotated one of the mold halves 6 is then moved in the direction of arrows 60 parallel of the removal axis 28 toward the other of the mold halves 4 to displace the convex outer mold surface 14 thereof and expose one half of the inner raceway 16 of the hardened outer race 18. The one mold half 6 is then moved in the direction of arrow 62 along the bore axis 13 of the selected assembly 46 to withdraw the one mold half 6 from the hardened outer race as indicated in phantom in FIG. 6.

The other of the mold halves 4 in the selected assembly 56 is then similarly rotated about axis 28, moved along the removal axis 28 toward the center of the hardened outer race bore to expose the other one half of the raceway 16 and then parallel of the mounting bore axis 13 to withdraw the other mold half 4 of the selected assembly 56 from the hardened outer race bore 32.

As previously explained, in the preferred method, a heat degradable adhesive 42 may be applied to the cylindrical axially split mold halves 4, 6 and cylindrical sleeve 22 to temporarily secure them in an assembled condition. Preferably, a heat source 64 will be used to cure the coated substrates 48 by heating to a temperature sufficient to degrade the adhesive.

When the outer race 18 is placed into use a split ball (not shown) that is similar in construction to that of mold halves 4 and 6 and having an axial ball bore will be inserted into the outer race 18 following the reverse order of the steps explained above for removing the mold halves 4 and 6. The split ball will be secured in the outer race by a retainer such as a tubular sleeve pressed into the ball bore after the split ball is finally positioned in the race.

Although one embodiment of the present invention has been illustrated and described, it will apparent to those skilled in the art that various changes and modifications may be made therein without departing from the spirit of the invention or from the scope of the appended claims.

We claim:

1. A method of producing a replaceable one piece outer race for a bearing, the outer race including an annular inner concave race surface, the concave race surface defining a bore having an outer race axis, said method comprising the steps of providing a mold assembly, the mold assembly including first and second separable mold halves, each of the first and second mold halves including a convex outer mold surface portion, assembling the first and second mold halves so that the convex outer mold surface portions thereof form an annular convex outer mold surface, the assembled first and second mold halves defining a mounting bore, the mounting bore having an axially extending mold axis, and a removal axis normal to the mold axis, applying an overlayment of filaments and hardenable liquid resin over the convex outer mold surface to form a one piece outer race substrate, the inner concave race surface of the outer race being formed over the convex outer mold surface, curing the outer race substrate to harden the outer race, and removing the mold assembly from the outer race.

2. The method of producing a replaceable one piece outer race as set forth in claim 1, said method including, before said step of applying the overlayment of filaments and hardenable liquid resin over the convex outer mold surface, the step of applying a heat degradable adhesive to the mold assembly to hold the mold assembly together, and wherein said step of curing the outer race substrate includes the step of heating the inner race substrate and mold assembly to degrade the heat degradable adhesive.

3. The method of producing a replaceable one piece outer race as set forth in claim 1, said method including, before said step of applying an overlayment of filaments and hardenable liquid resin over the convex outer mold surface, the step of applying a layer of self-lubricating material over said convex outer mold surface, and wherein the filaments are applied over the layer of self-lubricating material under tension to exert a bonding pressure on the layer of self-lubricating material to conform the layer of self-lubricating material to the convex outer surface mold surface.

4. The method of producing a replaceable one piece outer race as set forth in claim 3 wherein said method includes, before said step of applying a layer of self-lubricating material over said convex outer mold surface, the step of applying a heat degradable adhesive to the mold assembly to hold the mold assembly together, and wherein said step of curing the outer race substrate includes the step of heating the inner race substrate and mold assembly to degrade the heat degradable adhesive.

5. The method of producing a replaceable one piece outer race as set forth in claim 4 wherein said step of removing the mold assembly from the outer race includes the steps of rotating the first mold half about the removal axis relative to the second mold half, moving the rotated first mold half in a direction parallel to the removal axis, and then withdrawing the first mold half from the outer race in a direction parallel to the mold axis, and rotating the second mold half about the removal axis, moving the rotated second mold half in a direction parallel to the removal axis, and then withdrawing the second mold half from the outer race in a direction parallel to the mold axis.

6. A method of producing a replaceable one piece outer race having an outer race axis, an axial bore, an uninterrupted inner annular concave raceway facing into said outer race bore, and an outer surface, said method comprising the steps of:

A. providing a cylindrical axially split separable mold assembly comprising a mold axis, first and second separable semi-cylindrical mold halves each having a convex outer mold surface, a mounting bore extending axially through said mold assembly, a removal axis normal to said mold axis, and a support removably mounted in said mounting bore, and applying an overlayment of filaments onto said convex outer mold surfaces to form a one piece outer race substrate;

B. applying a coat of hardenable liquid resin on said substrate to penetrate said overlayment of filaments;

C. curing said coated substrate to form a hardened one piece outer race on said mold assembly;

D. removing said support axially from said mold mounting bore;

E. rotating one of said cylindrical mold halves about said removal axis 90° relative to the other said mold halves;

F. moving said rotated one of said mold halves parallel of said removal axis toward said other mold half to withdraw the convex outer mold surface thereof from the hardened outer race to expose one half of the inner annular concave raceway of said one piece outer race;

G. moving said withdrawn rotated one mold half of step F along said outer race axis to remove said one mold half from said hardened outer race bore; and H. rotating the other of said mold halves about said removal axis 90°, moving said other of said mold halves along said removal axis toward the center of the hardened outer race bore to expose the other one half of the inner annular concave raceway, and moving said other of said mold halves parallel to said outer race axis to remove said other mold half from said hardened outer race bore.

7. The method of claim 6 comprising, in step A, applying a heat degradable adhesive to said cylindrical axially split mold halves and support prior to their assembly so that they will be temporarily held together when combined into said separable mold assembly; and in step C, curing said coat of liquid resin by heating said substrate and mold assembly to a temperature sufficient to degrade said heat degradable adhesive.

8. The method according to claim 6 comprising, in step A, applying a layer of self-lubricating material over said cylindrical mold convex outer surfaces and applying said overlayment of filaments under tension onto said self-lubricating material to exert a bonding pressure on said layer of self-lubricating material sufficient to conform said layer of self-lubricating material to said convex outer surfaces.

9. The method according to claim 6 comprising, the additional step of finishing the outer surface of said hardened outer race to a desired dimension and configuration.

10. A method of producing a plurality of replaceable one piece outer races each having an outer race axis, an axial outer race bore, an uninterrupted inner concave raceway facing into said outer race bore, an outer surface, and axially spaced end surfaces, said method comprising the steps of:

A. providing a plurality of individual mold assemblies, each of said mold assemblies including first and second separable semi-cylindrical mold halves, each of said mold halves including a convex outer mold surface, and each of said mold assemblies including a mold axis, a mounting bore extending through said mold assembly along said mold axis, and a removal axis normal to said mold axis, and mounting said plurality of individual mold assemblies in axial alignment on a support, each of said mold assemblies being separated from an adjacent one of said mold assemblies by an interface;

B. applying an overlayment of filaments onto said mold assemblies to form an axially elongated one piece substrate;

C. applying a coat of hardenable liquid resin on said elongated substrate to penetrate said overlayment of filaments;

D. curing said coated elongated substrate to form a hardened elongated substrate comprising a plurality of axially connected hardened one piece outer races each surrounding one of said mold assemblies;

E. severing said elongated substrate at each of said interfaces to create a plurality of individual assemblies each including an outer race on one of said mold assemblies and having finished end surfaces;

F. separating each of said individual assemblies from said support if such separation was not done prior to severing in step E;

G. selecting each of said individual assemblies in turn and rotating one of said cylindrical mold halves in the selected assembly about said removal axis 90° thereof relative to the other of said mold halves thereof;

H. moving said rotated one of said mold halves of each selected assembly parallel of said removal axis thereof toward the other of said mold halves thereof to withdraw the convex outer mold surface of the rotated one of said mold halves from the hardened outer race of the selected assembly to expose one half of the inner annular concave raceway of the hardened outer race of the selected assembly;

I. moving said rotated one mold half orientated according to step H along said mounting bore axis of the selected assembly to remove said rotated one mold half from the hardened outer race bore;

J. moving the other of said mold halves in the selected assembly first about said removal axis 90° thereof, second along said removal axis toward the center of the hardened outer race bore to expose the outer half of the inner annular concave raceway and third, parallel of the outer race axis to remove said other mold half of the selected assembly from the hardened outer race bore thereof; and K. repeating steps G through J until said mold assemblies have been removed from all outer races.

11. The method according to claim 10 wherein said support includes a plurality of cylindrical support members each mounted in said mounting bore of one of said mold assemblies, and a mandrel on which said cylindrical supports are mounted.

12. The method according to claim 10 comprising, in step A, applying a heat degradable adhesive to said cylindrical axially split mold halves of each of said mold assemblies and the support prior to their assembly so that they will be temporarily held together when combined in an assembled condition; and in step D, curing said coated substrate by heating said substrate and mold assemblies to a temperature sufficient to degrade said heat degradable adhesive.

13. The method according to claim 10 comprising, in step A, applying a layer of self-lubricating material over said convex outer mold surfaces of said mold assemblies; and in step B, applying said overlayment of filaments under tension to exert a bonding pressure on said layer of self-lubricating material sufficient to conform said layer of self-lubricating material to said convex outer mold surfaces of said mold assemblies.

14. The method according to claim 10 comprising the additional step of finishing the outer surface of each hardened race to a desired dimension and configuration.

15. The method of claim 10 wherein, in step A said support includes a mandrel, a plurality of individual cylindrical support members on said mandrel, each of said cylindrical support members being positioned in said mounting bore of one of said individual mold assemblies, and spacers between said cylindrical support members.

* * * * *